United States Patent [19]

Karkau

[11] 4,164,292
[45] Aug. 14, 1979

[54] AUTOMATIC LIFT ASSEMBLY

[75] Inventor: Lawrence E. Karkau, Lansing, Mich.

[73] Assignee: Karphen Lift Company, Lansing, Mich.

[21] Appl. No.: 855,288

[22] Filed: Nov. 28, 1977

[51] Int. Cl.² .............................................. B60P 1/46
[52] U.S. Cl. .................................... 414/545; 105/448; 280/166; 414/921
[58] Field of Search ................. 214/75 R, 77 R, 77 P, 214/DIG. 13; 105/447, 448; 280/164 R, 166; 187/9 R

[56] References Cited

U.S. PATENT DOCUMENTS

| 4,027,807 | 6/1977 | Thorley .............................. 214/75 R |
| 4,124,096 | 11/1978 | Dudynskyj et al. ............ 214/75 R X |
| 4,124,100 | 11/1978 | Hawks ................................. 187/9 R |

Primary Examiner—Albert J. Makay
Attorney, Agent, or Firm—Miller, Morriss and Pappas

[57] ABSTRACT

This invention relates to an automatic lift device for use in association with doorway openings of buildings or of vehicles such as buses and vans so as to facilitate the loading and unloading of handicapped persons into and out of such buildings and/or vehicles. More specifically, the invention relates to an automatic lift device which consists of a lift carriage that is mounted within the doorway opening so as to be vertically movable therein. Movable step and riser elements are provided within the lift carriage so as to form normal upper and lower entrance steps in their retracted normal use position. The lift carriage is selectively movable to a lowered ground level position and a raised interior floor level position while the upper step and riser remain in their retracted normal step position within the lift carriage. The upper step and riser pivotally connected thereto are selectively extendable outwardly and downwardly so as to form a continuous horizontal loading platform in association with the fixed lower step formed by the base of the lift carriage. Thus formed, the horizontal loading platform can be selectively lowered to the ground or curb level or to any level intermediate thereto. It can be also selectively raised to the interior vehicle floor level thereby enabling a handicapped person, on crutches or in a wheelchair, to easily board or disembark from such vehicles at will. The riser element which is pivotally connected to the movable upper step can be selectively raised to form a ramp extension of the loading platform. The riser is pivotally movable from its ramp extension position so as to automatically compensate for uneven ground so as to facilitate movement of a wheelchair onto the loading platform. After a wheelchair has been moved onto the loading platform, the riser can be selectively pivotally moved to a position above the horizontal so as to act as a guard against inadvertent movement of the wheelchair from the platform while the platform is being raised to the level of the vehicle inside floor.

9 Claims, 17 Drawing Figures

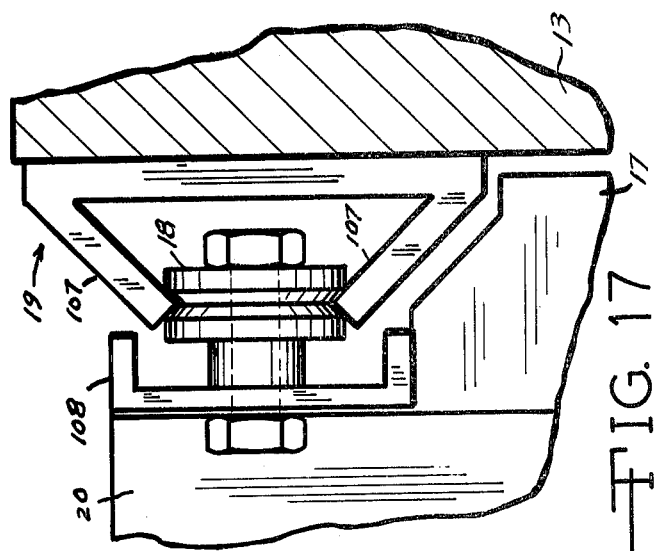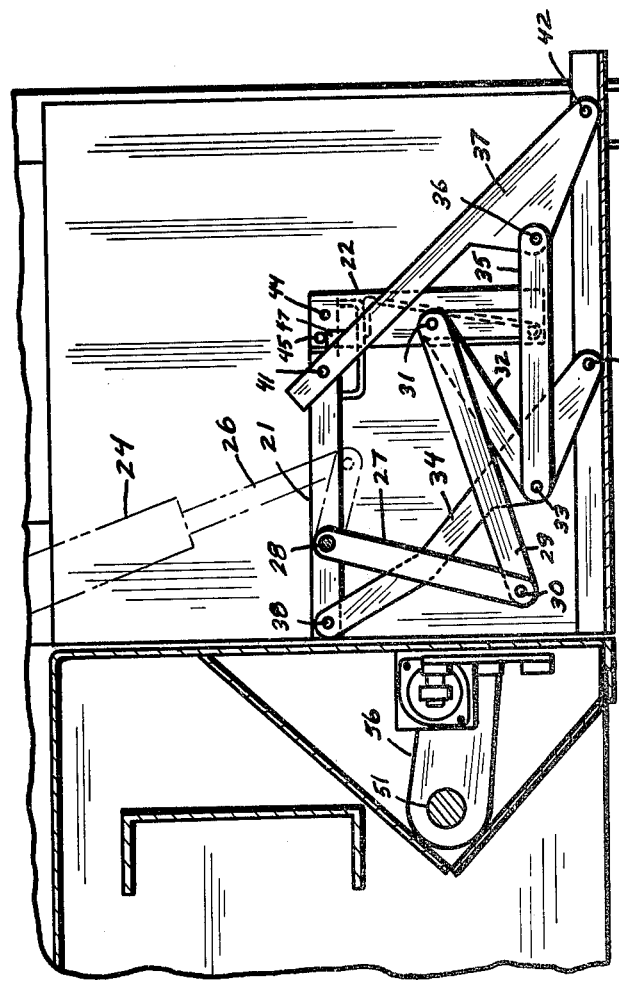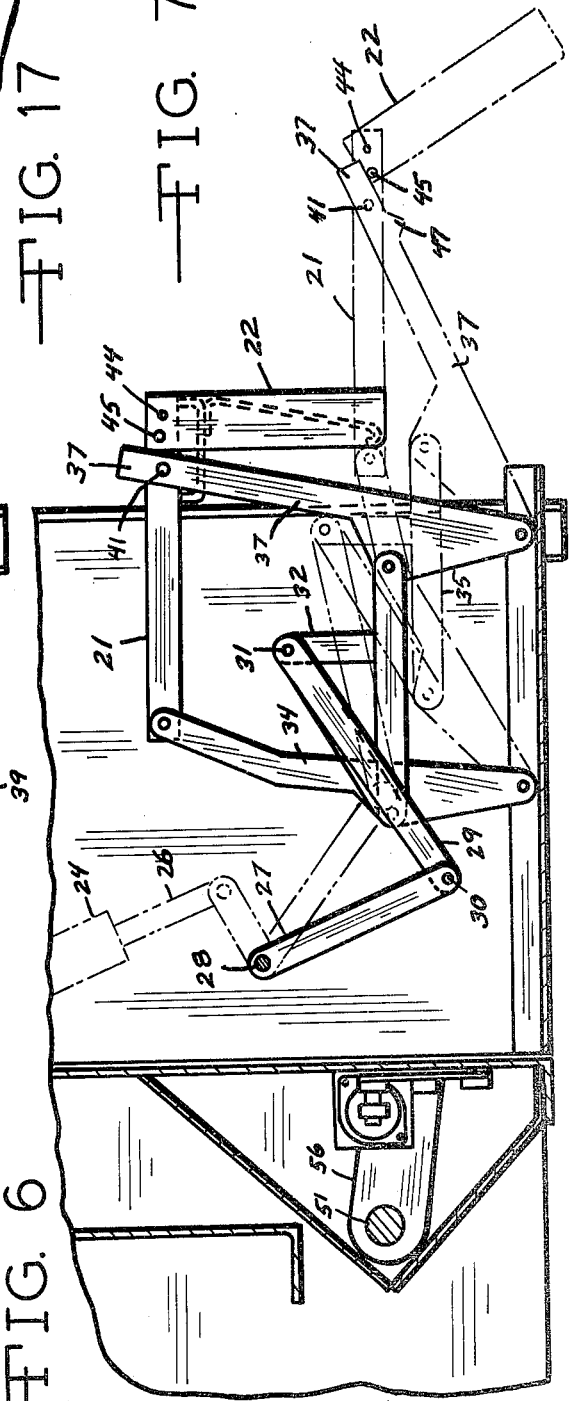

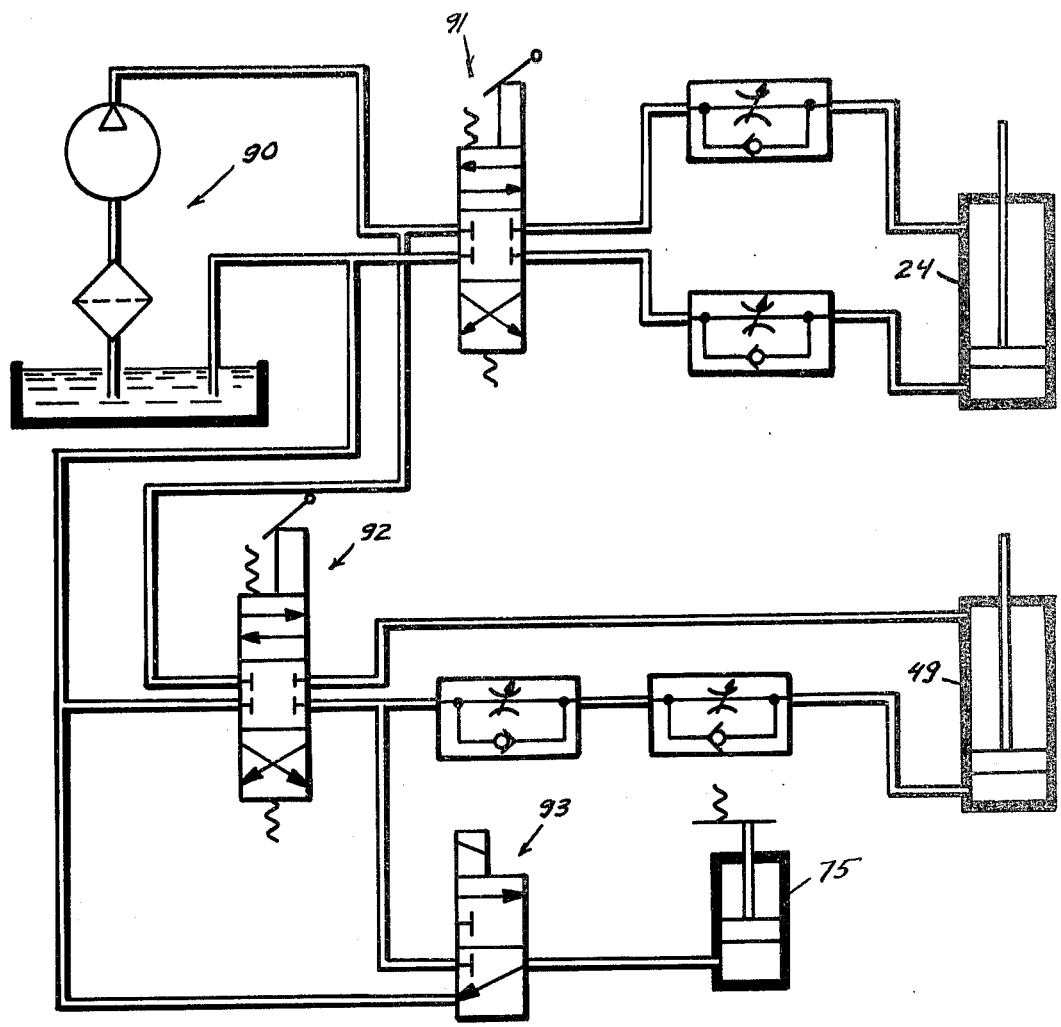
FIG. 13
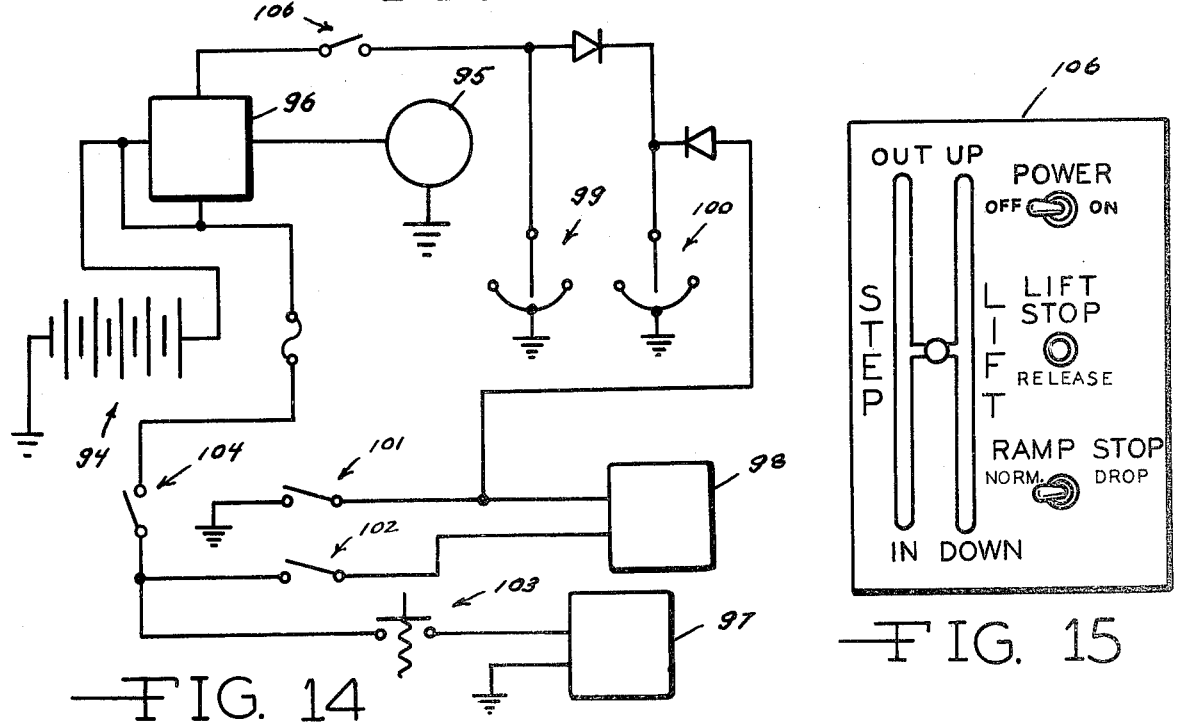
FIG. 14
FIG. 15

AUTOMATIC LIFT ASSEMBLY

It is thus seen that a highly utilitarian automatic lift device for vehicles is provided which consists of a vertically movable lift carriage which is easily mounted within a recess well of a doorway opening. The lift carriage is provided with normal steps which comprise a fixed lower step and a movable upper step and riser pivotally connected thereto. In its retracted normal use position, the upper step is positioned to the rear of the lift frame and the pivotally connected riser extends vertically downward to the fixed lower step formed by the base of the lift carriage.

It is thus seen that an automatic lift device is provided which includes a lift carriage which is provided with a normal step structure which can be selectively converted to a horizontal loading platform by an outward and downward movement of the upper step and concurrent upward movement of the riser pivotally connected thereto. This simplicity of structure and movement is not found in the devices of the prior known art.

It is further seen that an automatic lift device is provided which includes a lift carriage that can be selectively lowered to ground level or raised to interior floor level with the step assembly in its retracted normal use position or selectively extended to form a loading and unloading platform in connection with the base of the lift carriage.

It is therefore an object of this invention to provide an automatic door lift for doorway openings having a vertical movable lift carriage that can be easily installed in the doorway openings of buildings and of vehicles such as buses and vans.

Another object of this invention is to provide an automatic door lift having a lift carriage provided with a movable upper step and riser pivotally connected thereto and selectively extendable therefrom to form a loading platform.

Still another object of this invention is to provide an automatic door lift which is provided with an upper step and a riser which can be selectively converted into a loading platform which can be lowered to ground level to receive a handicapped person on crutches or in a wheelchair and which can then be raised to deliver such person to the interior floor level of the vehicles.

Yet another object of the invention is to provide an automatic door lift having a selectively retractable and extendable step structure which utilizes a movable riser to form a portion of the loading platform and which can be selectively actuated to form a raised wheelchair safety guard or stop while the loading platform is moving vertically.

Another object of this invention is to provide a highly utilitarian automatic door lift for vehicles which has a minimum of moving components and which in use requires no ancillary components other than the existing step and riser element to convert from the retracted normal step configuration to the extended loading platform configuration.

The automatic lift structure is thus simple in design and has a minimal number of movable components in operation. It does not require any ancillary components or extensions in the operation thereof. Further, it is within the scope of the invention that the automatic lift structure can also be incorporated into doorways of fixed structures such as doorways of apartments, offices, homes and the like.

The lift structures of the prior known art are highly complicated, both in structure and in operational movement. In addition, they utilize components which are ancillary to the normal step structures in order to provide safety guards incident to the safe operation of the lift. Representative examples of such prior art devices are seen in the U.S. Pat. Nos. to Thorley 4,027,807, Maroshick 3,913,497, Abreu 4,026,387, Pohl 3,984,014, Perkins 4,007,844 and Wark 3,918,596.

Other objects will be apparent to those skilled in the art upon reading the present description, drawings and claims.

IN THE DRAWINGS

FIG. 6 is a schematic side elevation view showing the step extending actuating linkage means in their retracted position.

FIG. 7 is a schematic side elevation view of the step extending actuating linkage means illustrating the step and riser being progressively pivotally extended and lowered to form the loading platform and ramp.

FIG. 13 is a schematic flow diagram showing the hydraulic control system.

FIG. 14 is a schematic diagram showing the electrical control circuitry.

FIG. 15 is a plan view of the actuating control panel for the automatic lift assembly.

FIG. 17 is a schematic cross-sectional view of the vertical track assembly.

GENERAL DESCRIPTION

An automatic lift assembly is provided for use in vehicle or building doorways which consists of a lift carriage movably positioned within a doorway opening. The lift carriage has a substantially u-shaped configuration wherein the horizontal base thereof is adapted to form a lower step portion. A movable upper step is pivotally positioned with the lift carriage in a normally retracted stowed step use position above and to the rear of the lower step portion. The upper step is selectively extendable forwardly and downwardly so as to form a co-planar platform extension of the lower step portion. A movable riser is provided in pivotal engagement with the upper step so as to selectively extend downwardly to the lower step portion when the upper step is in its retracted stowed step use position within the lift carriage. The riser is selectively extended upwardly and outwardly to form a ramp extension from the extended upper step. Lift carriage actuating means are provided to selectively lower the lift carriage to ground level and to selectively raise the lift carriage to the interior floor level of the building or vehicle. The lift carriage actuating means include a main pivot actuator shaft positioned behind the lift carriage. The pivot actuator shaft is provided with a pair of fixed spaced-apart pivot support arms which bracket and are in pivotal link engagement with the lift carriage. The actuator shaft is selectively rotatable so as to selectively raise and lower the lift carriage.

The main pivot actuator shaft is selectively rotated by a hydraulically operated steering gear power unit. The steering gear power unit is adapted to translate the linear motion of the piston provided therein to rotary motion to drive the main pivot actuator shaft.

Safety stop assembly means are provided in the doorway opening in selective engagement with the pivot support arms so as to support the lift carriage in its intermediate normal use position. The safety stop assembly means are selectively retractable out of engagement with the pivot support arms so as to permit selective raising and lowering of the lift carriage. Riser safety guard actuating means are provided in association with the movable upper step and the pivotally movable riser. The riser safety guard actuating means are adapted to selectively pivot the riser to an upwardly inclined safety guard position when the upper step in its extended platform extension position. Control panel actuating means are provided to selectively control the lift carriage actuating means, the movable upper step and riser pivotally connected thereto, the safety stop assembly means and the riser safety guard actuating means.

SPECIFIC DESCRIPTION OF A PREFERRED EMBODIMENT

Figure 1:
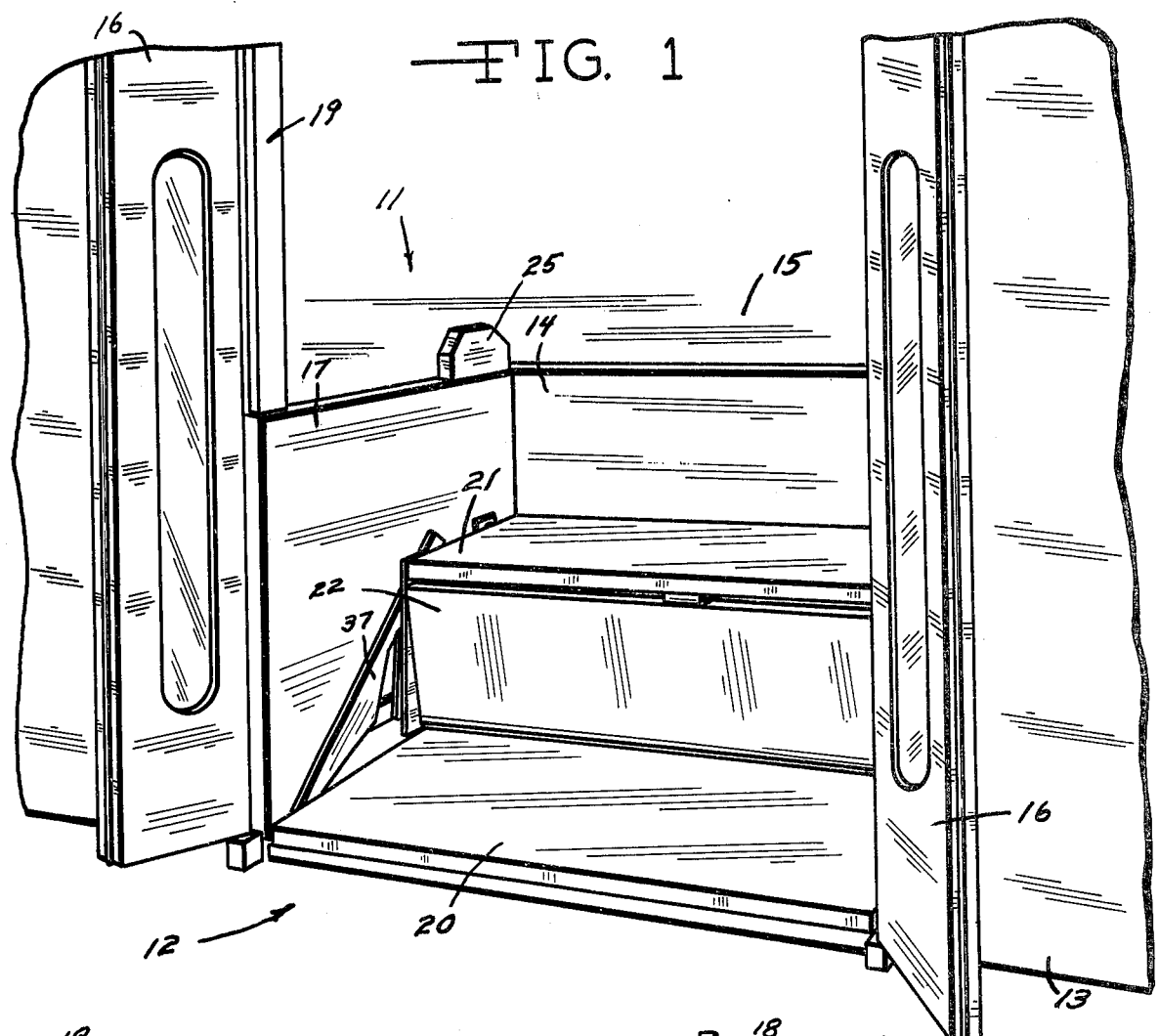
FIG. 1 is a perspective view of the automatic lift assembly showing the lift assembly in its use position in a vehicle door opening with the upper step and riser retracted into their normal step use position.

As shown in FIG. 1, the automatic lift assembly 11 is mounted in the door opening 12 of the vehicle 13. The automatic lift assembly 11 is mounted within a step well recess 14 provided in the vehicle floor 15 and is vertically movable therein. Thus positioned, the automatic lift assembly 11 does not interfere with the normal operation of the vehicle door 16. The automatic lift consists of a substantially u-shaped metal lift carriage 17 which is provided with vertically aligned rollers 18 on each side thereof which are adapted to slidably engage vertical track body guides 19 which are mounted along each side of the door opening. As shown in FIG. 1, the base of the lift carriage 17 forms the lower step 20.

Figure 3:
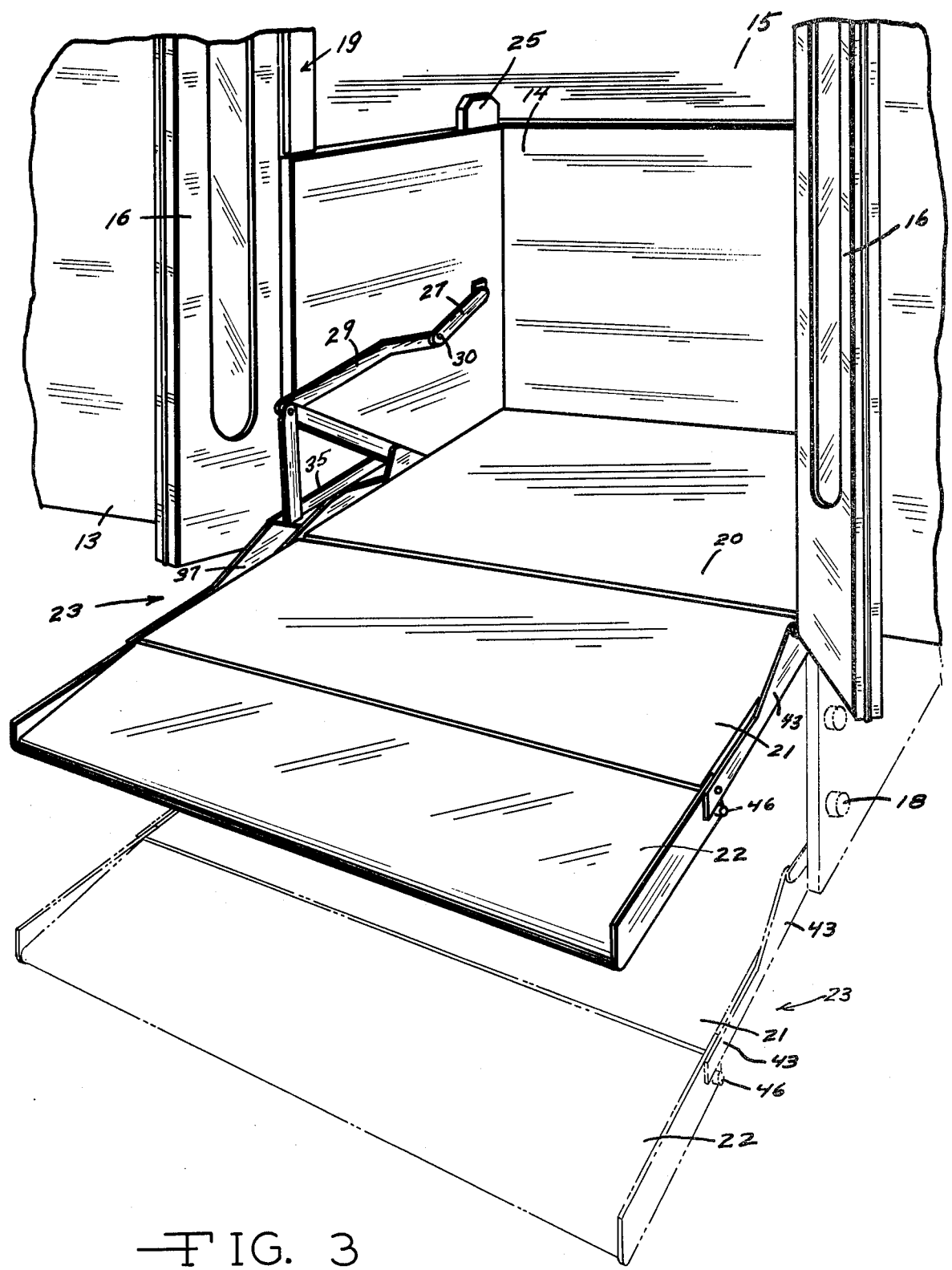
FIG. 3 is a perspective view of the automatic lift assembly illustrating the step and riser extended to form a loading platform and ramp and showing the lift carriage and platform in phantom line lowered to the ground level loading position.
Figure 4:
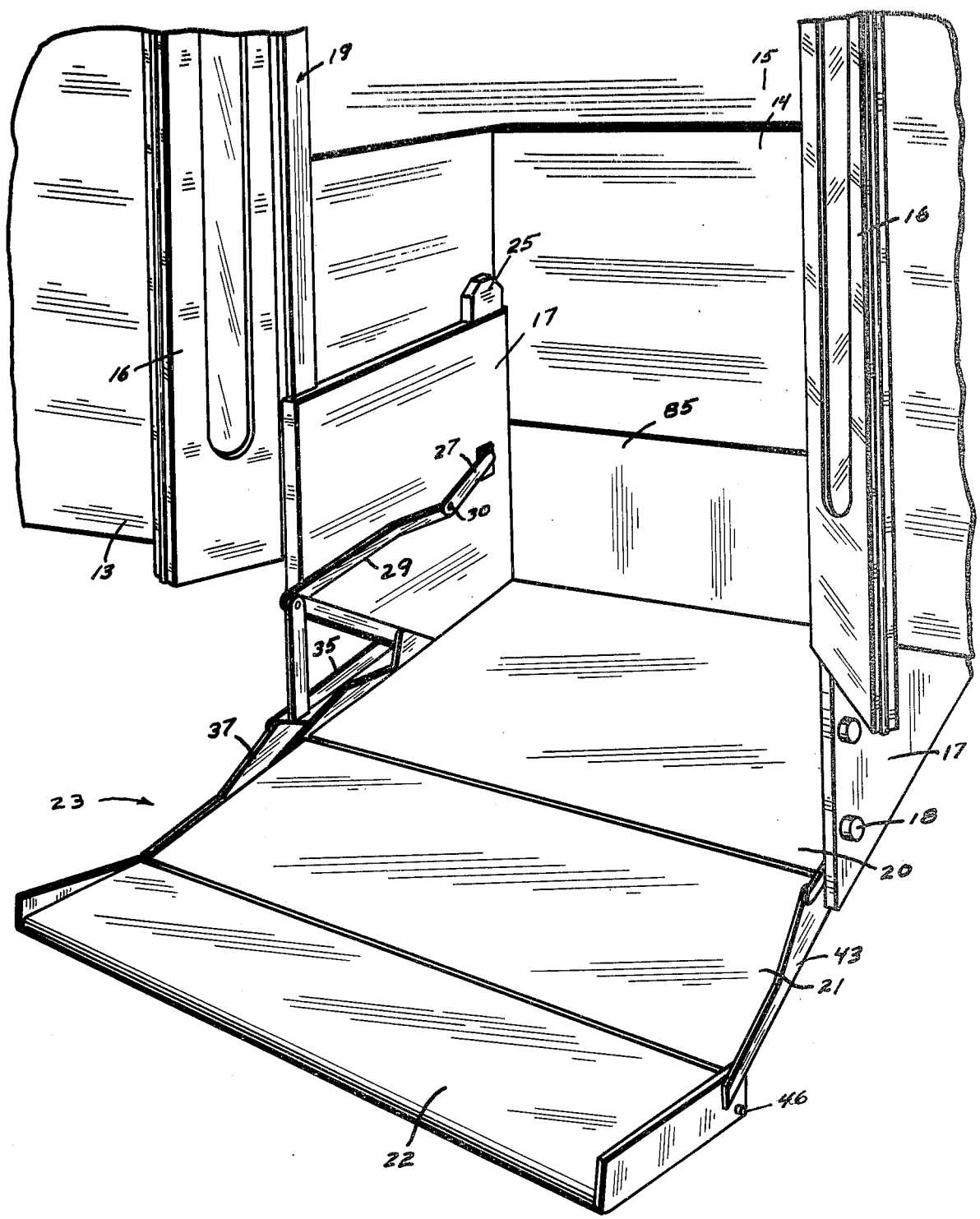
FIG. 4 is a perspective view of the automatic lift assembly in its lowered ground level loading position with the riser element in its upwardly inclined safety guard position.

As will be hereinafter described, a retractable upper step 21 having a riser 22 pivotally connected thereto is provided within the lift carriage 17. The upper step 21 and the riser 22 are movable with and are selectively extendable from the lift carriage 17 so as to form a loading platform extension 23 in combination with the base 20 of the carriage lift 17 as shown in FIGS. 3 and 4. More specifically, the platform 23 is formed by pivotally extending and lowering the upper step 21 so that it lies in an abutting co-planar relationship with the base 20 of the lift carriage 17. The riser 22 is pivotally extended upwardly so as to provide a ramp extension to complete the loading platform as shown in FIG. 3. The loading platform 23 is shown in phantom line in FIG. 3 in its lowered ground level loading position so as to receive a wheelchair or permit an ambulatory person to walk directly thereon.

As shown in FIG. 4, the lift carriage 17 and platform 23 associated therewith is shown in its lowered ground level loading position. The riser 22 is in its raised safety guard position which prevents a wheelchair (not shown) from rolling off of the platform while it is being raised or lowered.

Figure 5:
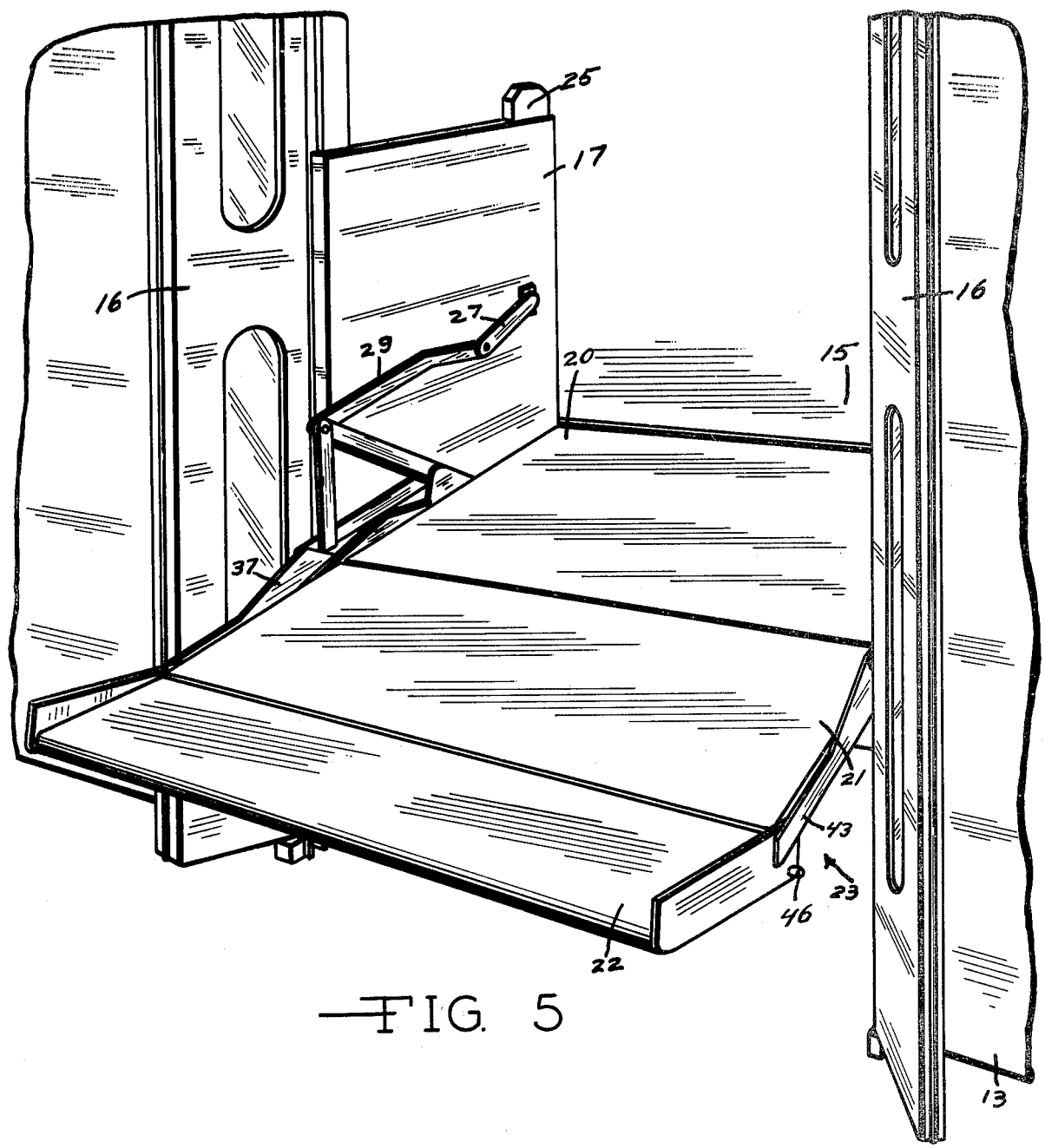
FIG. 5 is a perspective view of the automatic lift assembly with the lift carriage and loading platform in its raised unloading position level with the interior floor of the vehicle.

As shown in FIG. 5, the lift carriage 17 is raised so that the platform 23 is at the level of the interior floor of the vehicle so that the wheelchair or person thereon can be moved directly into the interior of the vehicle.

It should be noted that lift carriage 17 with the retracted step 21 and riser 22 in their retracted normal use step position as shown in FIG. 1 can be lowered to ground level so that a person can step thereon. The lift carriage can subsequently be raised to permit the user to step or walk into the interior of the vehicle as necessary.

The step actuating linkage means are shown in FIG. 6 (step and riser retracted) and in FIG. 7 (step and riser being extended). It is within the scope of the invention to add corresponding co-acting step actuating linkage means to the other side of the lift carriage. A step actuating control cylinder 24 is anchored at one end to an anchor block 25 provided at the top of one of the side panels of the lift carriage 17 and is movable therewith. The control cylinder actuator rod 26 is pivotally connected to an angular lever 27 which is pivotal about pivot pin 28 provided in the side wall of the lift carriage. The angular control lever 27 is in turn pivotally connected to a first connector link 29 by pin 30. The first connector link 29 is in turn pivotally connected to the second connector link 32 by pin 31. The second connector link 32 is connected at its other end to the first pivotal extender arm 34 by pin 33. A third connector link 35 is pivotally connected at one end to pin 33 and at the other end to pin 36 provided on the second pivotal extender arm 37.

The first pivotal extender arm 34 is pivotally connected at one end thereof to the upper step 21 by pin 38 and at the other end thereof is fixedly connected to rod 39 which is provided through the base of the carriage lift. Rod 39 extends through the base of the carriage lift to fixedly engage a corresponding extender arm 40 positioned on the opposite side of the carriage lift 17. The extender arm 40 is similarly connected to the opposite end of the upper step 21. The second pivotal extender arm 37 is pivotally connected at one end thereof to the upper step 21 by pin 41 and at the other end thereof is fixedly connected to rod 42 which is provided through the base of the carriage lift. Rod 42 which is spaced apart from and parallel to rod 39, also extends through the base of the carriage lift to fixedly engage a corresponding extender arm 43 positioned on the opposite side of the carriage lift. The extender arm 43 is similarly connected to the opposite end of upper step 21.

The riser 22 is pivotally connected to upper step 21 at points 44 at each end of upper step 21. Cam pins 45 and 46, respectively, extend outwardly from each end of the riser 22. As shown in FIG. 6, the cam pin 45 engages a cam extension 47 provided on the second extender arm 37 so as to retain the riser in its retracted vertical position. A similar cam extension (not shown) is provided on the corresponding extender arm 43 so as to engage cam pin 46.

As shown in phantom line in FIG. 7, when the extender arm 37 is pivoted outwardly, the end thereof moves into contact with cam pin 45 so as to pivotally move the riser into a slightly below horizontal ramp position. The same action occurs on the opposite end of the riser when the end of the extender arm 43 engages cam pin 46.

Figure 2:
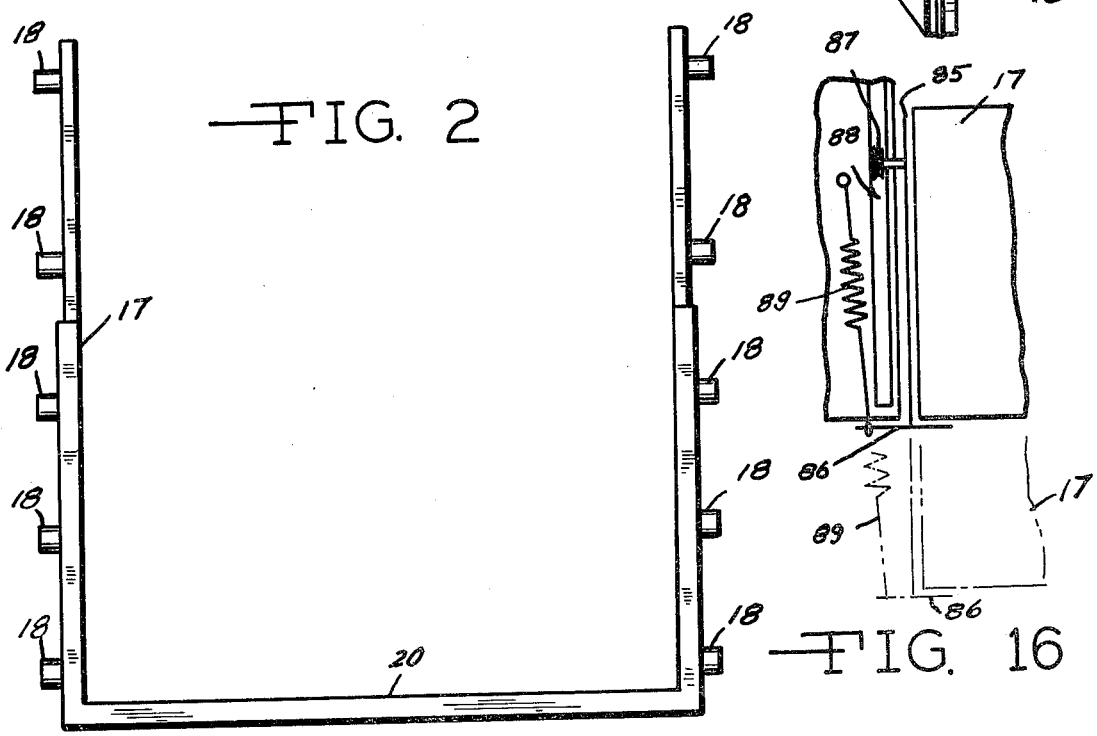
FIG. 2 is a front elevation view of the substantially u-shaped lift carriage showing the roller means which engage the vertical track means provided along each side of the vehicle door opening.

In operation, the step actuating linkage means can be selectively actuated to pivotally extend the upper step 21 and riser 22 outwardly and downwardly so as to form a co-planar platform extension 23 of the lower step or base 20 of the carriage lift 17 as shown in FIG. 3. As shown in FIG. 7, this is accomplished by activation of actuating cylinder 24 to selectively retract piston rod 26. The piston rod 26 acts upon the angular control lever 27 so as to pivot the angular control lever 27 about pivot pin 28. Thus pivoted, the angular control lever 27 acts upon the connector links 29 and 32 so as to pivotally move the first and second extender arms 34 and 37, respectively, about the pivot points established by rods 39 and 42. The extender arms 34 and 37 move simultaneously because they are connected by connector link 35. The corresponding oppositely extender arms 40 and 43 move simultaneously because they are fixedly connected to rods 39 and 42, respectively. Thus the pivotal movement of the extender arms 34, 40, and 37, 43 moves the upper step 21 outwardly and downwardly while maintaining its horizontally oriented position. As extender arms 37 and 43 are pivoted toward their substantially horizontal extended position, they contact cam pins 45 and 46, respectively, so as to pivotally raise the riser 22 to its ramp position as shown in FIG. 2. In actuality, the riser 22 is only pivoted to a position which is approximately 30 degrees below horizontal. The riser 22 is free to rotate upwardly toward a horizontal position as required upon contact with the ground or curb so as to provide a ramp for rolling a load upon the platform 23.

Figure 8:
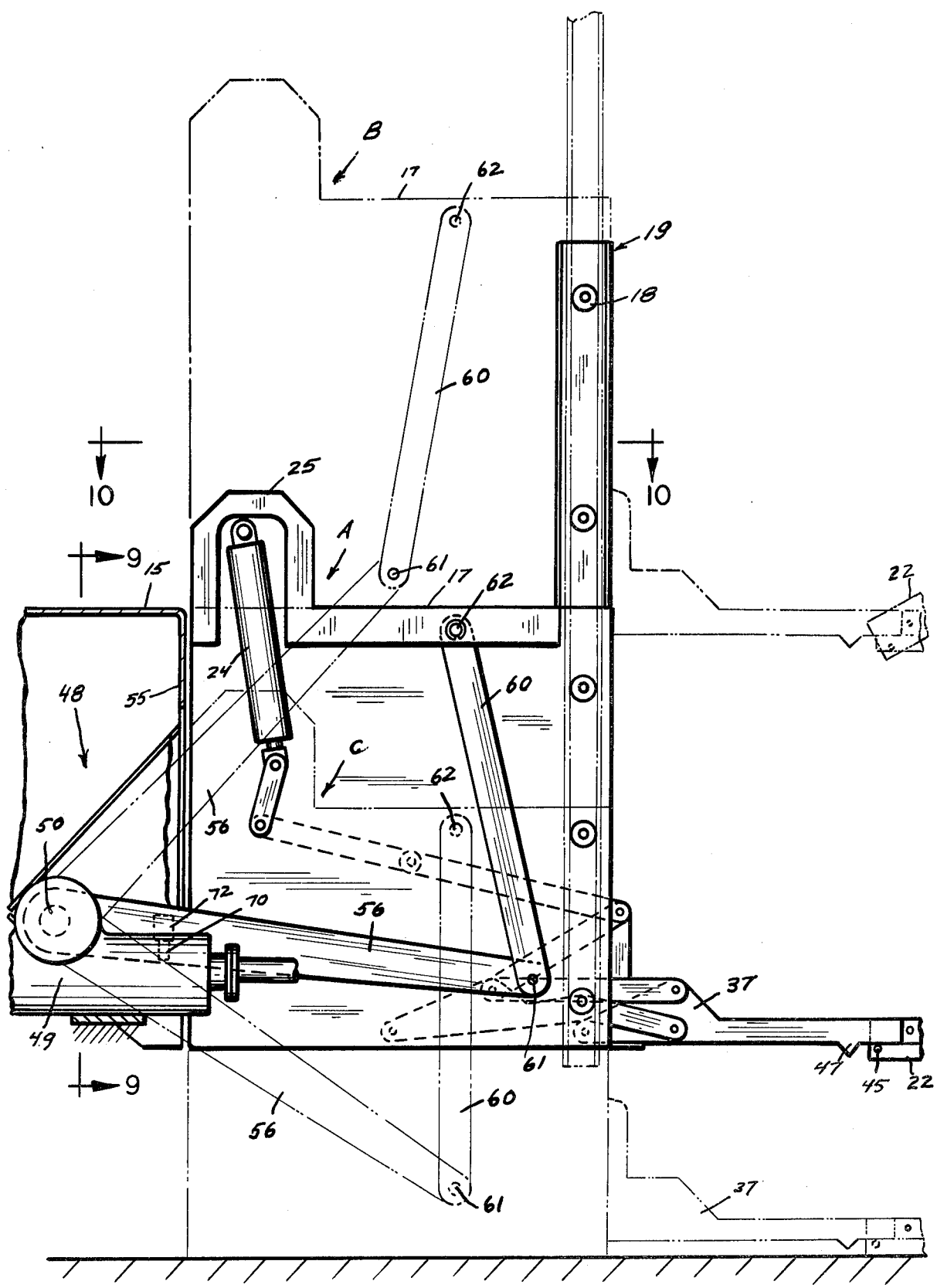
FIG. 8 is a schematic side elevation view of the automatic lift assembly illustrating the lift carriage actuating means and showing the lift carriage in its lowered ground level position, in its intermediate normal step position and in its raised vehicle floor level position.
Figure 9:
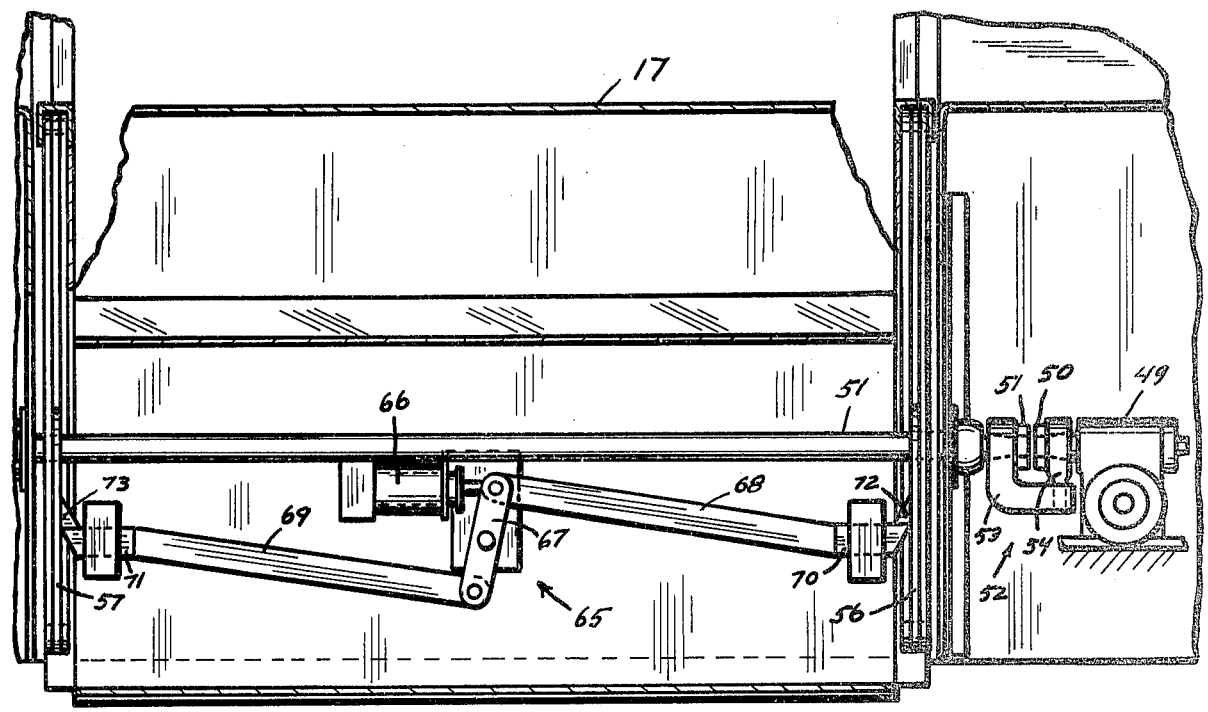
FIG. 9 is a schematic cross-sectional rear elevation view of the automatic lift assembly taken on line 9—9 of FIG. 8 showing the lift carriage safety lock assembly in engagement with the pivot arms of the lift carriage actuating means.
Figure 10:
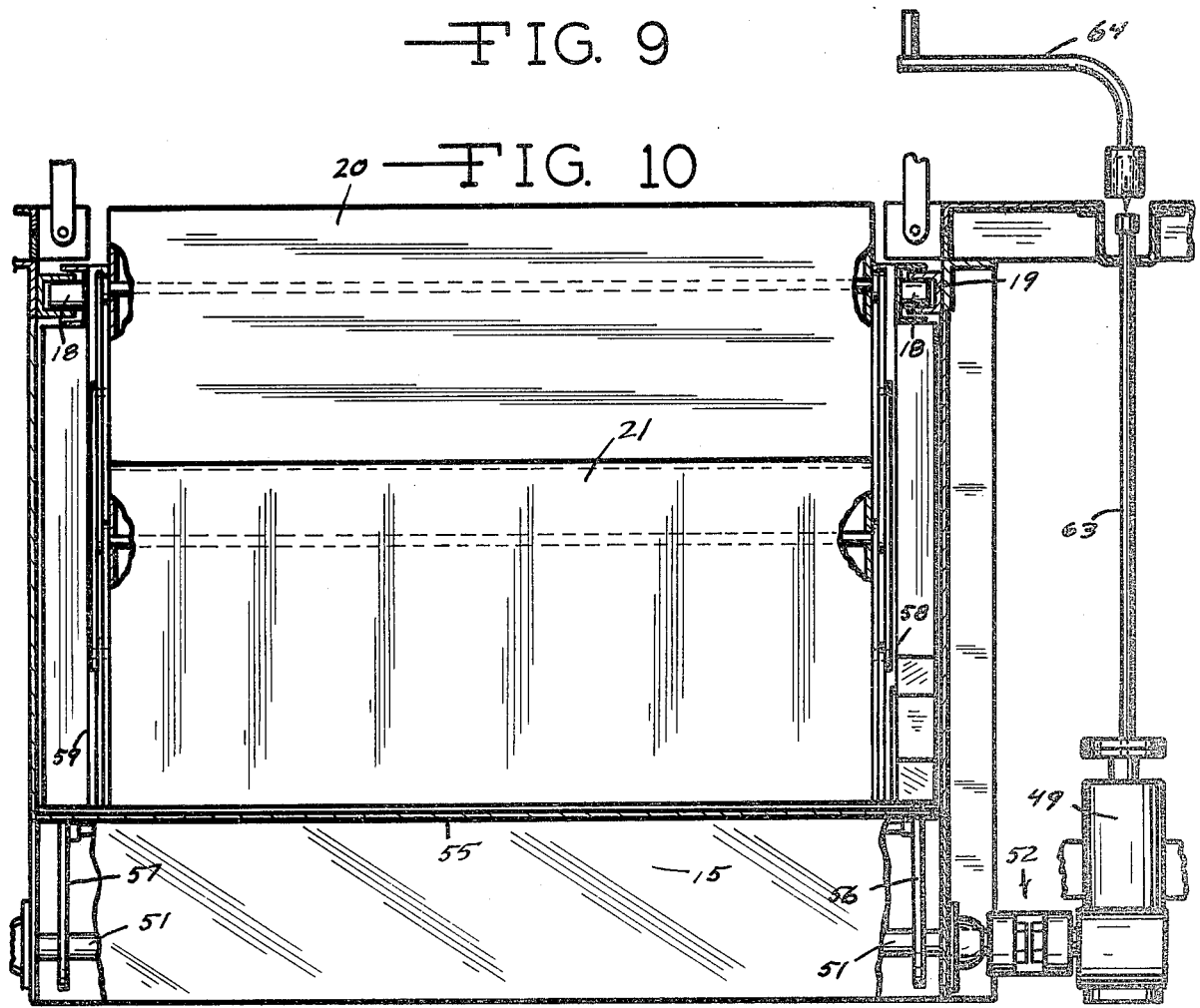
FIG. 10 is a schematic cross-sectional top view of the automatic lift assembly taken on line 10—10 of FIG. 8 showing the lift carriage and the lift carriage actuating means associated therewith.

The lift carriage actuating means 48 are shown in FIGS. 8 through 10. The lift carriage assembly is selectively raised or lowered by applying hydraulic pressure to a power unit 49 which consists of a double acting hydraulic piston whose linear travel is converted to rotary output through interference meshed teeth on the piston and on the output shaft. The rotary output shaft 50 is adjustably connected to the main pivot actuator shaft 51 by use of adjustment connector means 52. The adjustment connector means 52 comprises an elbow connector arm 53 which is fixedly connected to the main pivot actuator shaft 51 and which is adapted to engage a collar pin extension 54 provided on the rotary output shaft 50. The main pivot actuator shaft 51 extends parallel to and behind the rear wall 55 of the well recess in which the lift carriage 17 is mounted. A pair of spaced-apart lift carriage pivot support arms 56 and 57, respectively, are fixedly attached to the actuator shaft 51 and are configured to extend into the recess well parallel to and spaced apart from the exterior surfaces 58 and 59, respectively, of the side walls of the lift carriage 17.

Each of the lift carriage pivot arms 56 and 57, respectively, are pivotally connected to one end of the connector links 60 by pivot pins 61. Each connector link 60 is pivotally anchored to the respective sides of the lift carriage by anchor pin 62. As shown in FIG. 8, the pivot arms 56 and 57 in conjunction with their respective connector links 60 support the lift carriage 17 in its normal use position A with the recess well. Upon selective actuation of the power unit 49, the main pivot actuator shaft 51 is rotated to pivotally raise the pivot arms 56 and 57 extending therefrom. This movement raises the connector links 60 with the resultant lifting of the lift carriage 17 to the raised position B as shown in phantom line in FIG. 8. In this position the base 20 of the lift carriage is even with the interior floor 15 of the vehicle.

Upon selective rotation of the main pivot actuator shaft 51 in the opposite direction, the pivot arms 56 and 57 and connector links 60 are lowered so as to move the lift carriage 17 to its ground or curb level lowered position C as further shown in phantom line in FIG. 8. Although in FIG. 8 the lift carriage 17 is shown with the upper step 21 and riser 22 in their extended platform 23 position, it is possible for the lift carriage 17 to be moved to the raised B and lowered C positions with the upper step 21 and riser 22 remaining in their normal retracted stowed step position as shown in FIG. 1.

As shown in FIG. 10, the power unit 49 is provided with a manual control shaft 63 and detachable handle 64 so that the lift carriage 17 can be manually raised, lowered and/or returned to its normal intermediate position B in event of failure of the regular hydraulic control system.

As shown in FIG. 9, a selectively actuated safety stop assembly 65 is provided to support the lift carriage 17 in its normal step height position B within the recess well. A solenoid actuator cylinder 66 is provided in engagement with a pivotal control link 67 which is connected to actuator connector links 68 and 69 at each end thereof. The actuator connector links 68 and 69 are provided with safety slide blocks 70 and 71, respectively, which are adapted to supportably engage fixed support blocks 72 and 73 provided on the pivot arms 56 and 57, respectively, while the lift carriage 17 is in its normal step height position B. Prior to lowering the lift carriage 17 to its lowered position C, the actuator cylinder 66 is actuated so as to retract the slide blocks 70 and 71 out of contact with fixed support blocks 72 and 73, respectively. This permits the pivot arms 56 and 57 to be lowered as desired. In practice, the pivot arms 56 and 57, and hence the lift carriage 17, are raised slightly so as to release the load on the safety slide blocks 70 and 71, thus permitting the cylinder 64 to easily retract them. This feature tests the integrity of both the electrical and hydraulic systems before allowing the lift to be deployed.

The safety slide blocks 70 and 71 are spring biased to return to their normal support interference position in alignment with the fixed support blocks 72 and 73 after the lift carriage 17 has been lowered.

After the pivot arms 56 and 57 are lowered, the spring biased slide blocks 70 and 71 move outwardly back into their normal support position. Both the fixed support blocks 72 and 73 and their respective slide blocks 70 and 71 are correspondingly tapered so that the fixed support blocks 72 and 73 easily displace and move past the safety slide blocks 70 and 71 as the pivot arms 56 and 57 pivot upwardly to move the lift carriage 17 into its raised position B as shown in FIG. 8.

Thereafter, when the pivot arms 56 and 57 move downwardly to return the lift carriage 17 to its normal rest position A, the fixed support blocks 72 and 73 come to rest upon the slide blocks 70 and 71 so as to support the lift carriage 17 in position A. This is shown in FIG. 9 and in phantom line in FIG. 8. It is within the scope of the invention to provide for selective mechanical, rather than solenoid, actuated retraction of the slide blocks 70 and 71. In addition, in another embodiment of the invention the linkage controlled slide blocks are provided on the pivot arms 56 and 57 and the fixed support blocks are correspondingly mounted on the side walls of the recess well (not shown).

Figure 11:
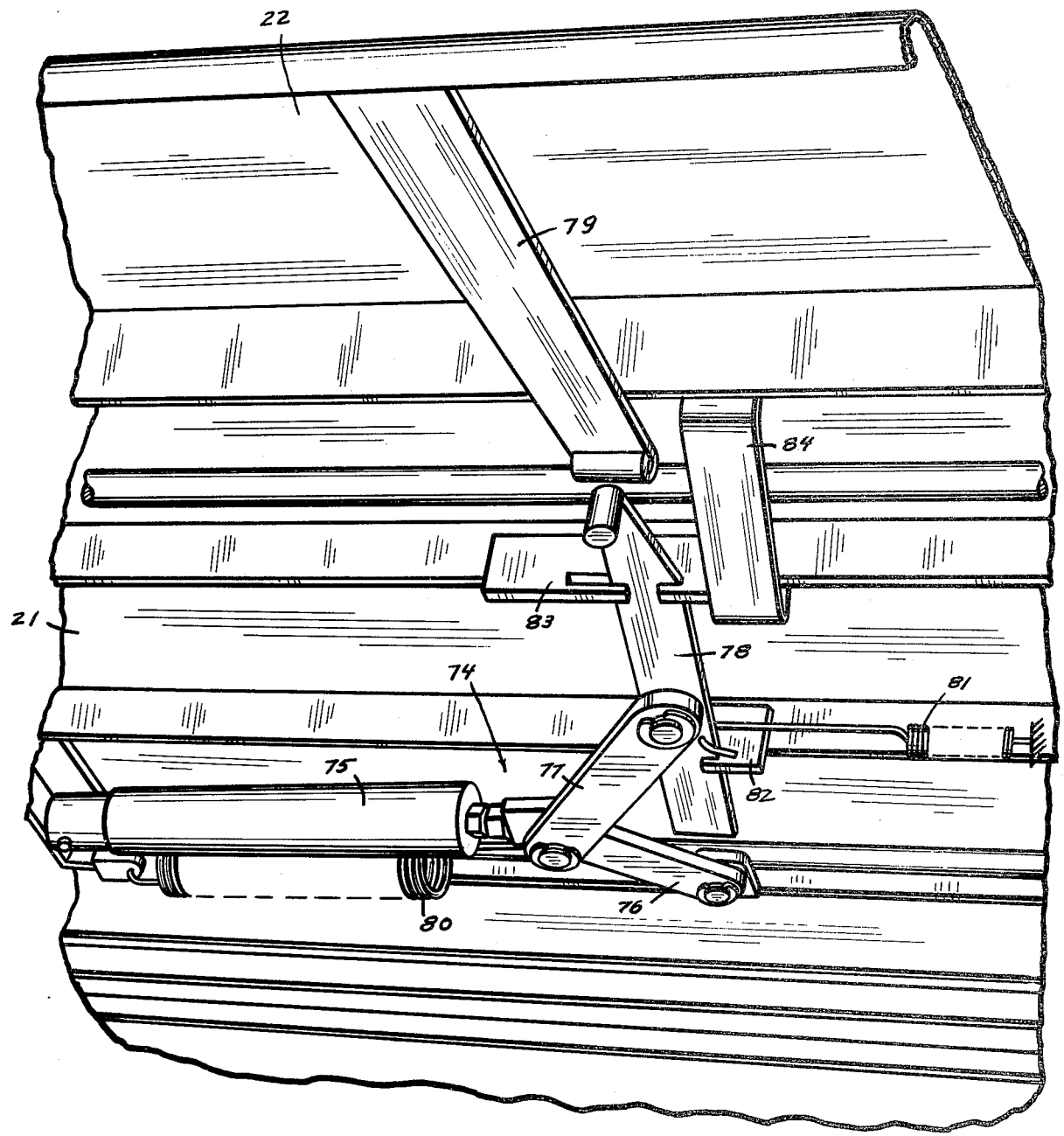
FIG. 11 is a schematic bottom perspective view of the extended loading platform showing the riser safety guard actuating assembly in its normally rest position.
Figure 12:
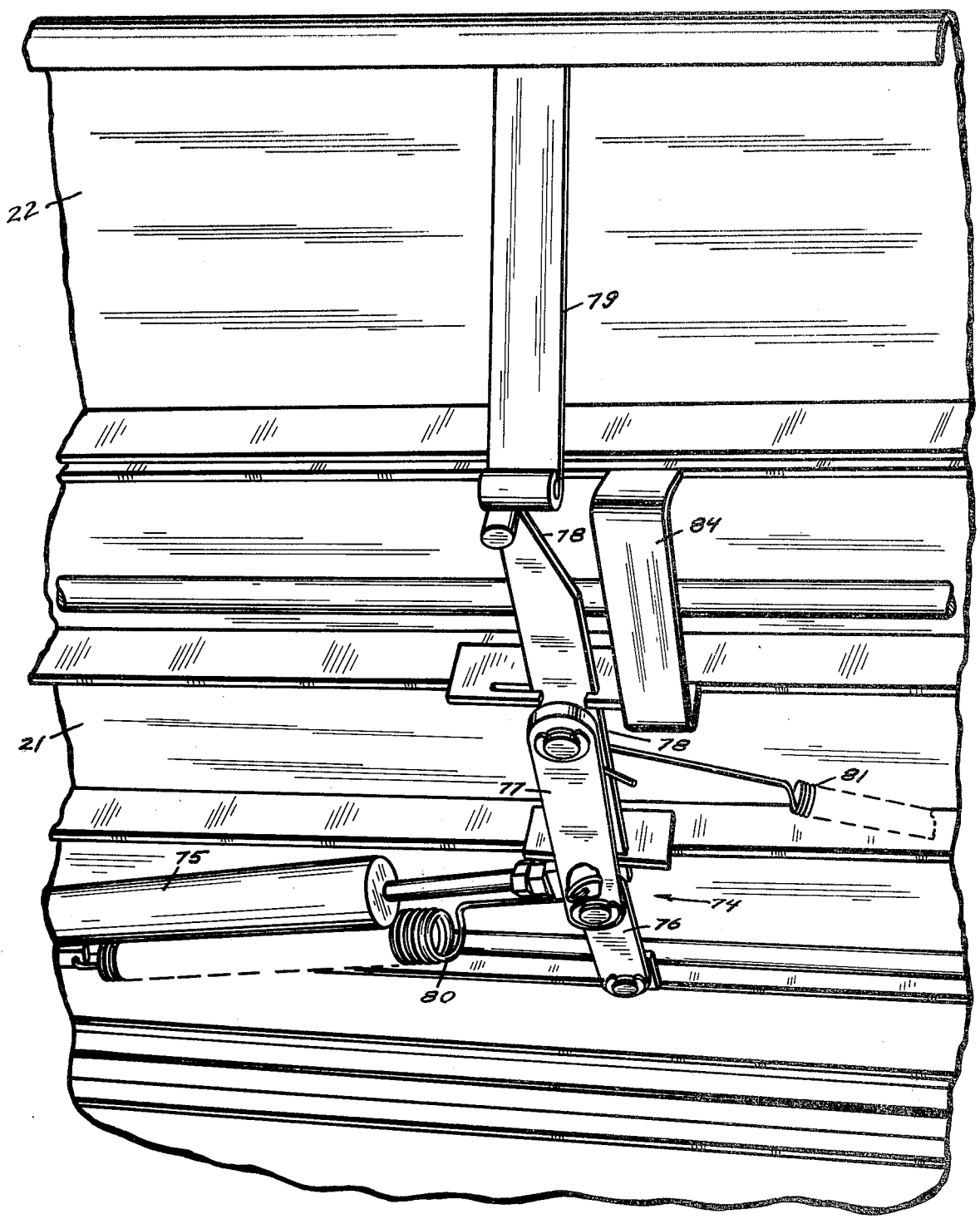
FIG. 12 is a schematic bottom perspective view of the extended loading platform showing the riser safety guard actuating assembly in engagement to move the riser to its raised safety guard position.

As shown in FIGS. 11 and 12, a riser safety guard actuating assembly 74 is provided so as to selectively raise the riser 22 to a raised safety stop position of about 30 to 35degrees above the horizontal as shown in FIGS. 4, 5, 8 and 12. In this raised position, the riser 22 prevents a wheelchair or the like from rolling off the lift carriage 17 onto the ground. The riser safety guard actuating assembly 74 consists of a hydraulic actuating cylinder 75 which acts upon pivotally connected actuating links 76 and 77. The actuating links 76 and 77 in turn act upon a slidable push rod 78 which selectively bears against the fixed lift rod 79 provided on the riser 22 so as to pivotally raise the riser 22 to its raised inclined safety stop position. The pivotal links 76 and 77 are biased by spring 80 so as to retract the slidable push rod 76 when the actuating cylinder 75 is not exerting pressure against the links 76 and 77. A spring 81 retains the slidable push rod 78 within its guide supports 82 and 83. The guide supports 82 and 83 are slotted so as to permit side clearance movement of the push rod 78 if the riser encounters an obstacle and the fixed push rod 79 cannot move in response to pressure from the actuating cylinder 75. As shown in FIGS. 11 and 12, the actuating cylinder 75, the pivotal links 76 and 77, the slidable push rod 78, the guide supports 82 and 83 and springs 80 and 81 are positioned beneath the upper step 21 and are movable therewith. The fixed lift rod 79 is positioned on the rear side of the riser 22 in direct alignment with the slide push rod 78. A ground rest member 84 is provided on the bottom side of the upper step 21 as shown in FIGS. 11 and 12.

A movable step shield panel assembly is provided in association with the lift carriage 17 so as to provide an enclosed continuation of the recess well when the lift carriage is moved to its lowered ground position C as shown in FIG. 4. The step shield panel 85 moves with the lift carriage 17 and acts as a safety shield to protect the legs of a person riding on the lift carriage from contact with the vehicle body and associated actuating structures positioned behind the safety shield panel 85.

Figure 16:
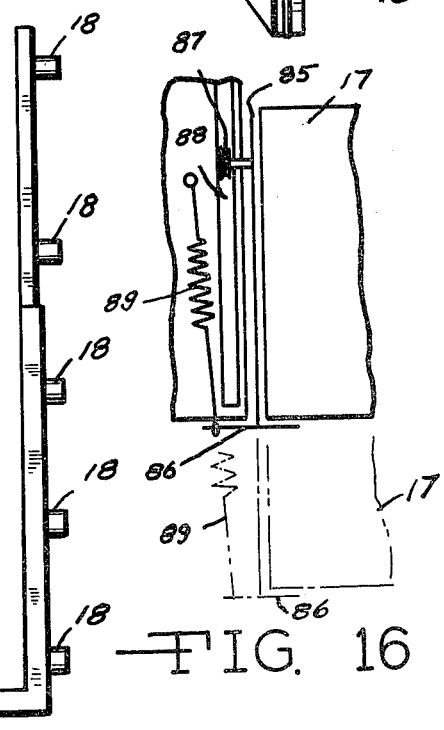
FIG. 16 is a schematic end view of the lift shield assembly.

As shown in FIG. 16, one embodiment of the step shield panel assembly consists of a vertically oriented panel 85 which extends across the rear open portion of the U-shaped lift carriage 17. An elongate horizontal flange 86 is provided along the lower edge of the step shield panel 85. Guide members 87 are provided on the rear surface of the step shield 85 which slidably engage channels 88 provided along the rear wall of the recess well. Retaining springs 89 engage the rear portion of the flange 86 so as to retain the shield in its normally up stowed position. As the U-shaped lift carriage 17 is moved to its lowered ground position C, the lower portion of the lift carriage 17 moves against the flange 86 to draw the shield panel 85 downwardly therewith. As the lift carriage 17 moves upwardly, the action of the spring 89 returns the step shield panel 85 to its stowed position with the rear portion of the flange 86 drawn against the lower edge of the rear wall of the recess well. It is within the scope of the invention to use alternate means of enabling the step shield panel to co-act with the lift carriage in the foregoing manner.

A schematic flow diagram of the hydraulic system of the preferred embodiment of the invention is shown in FIG. 13. A pump and reservoir 90 is provided with manual controls 91 and 92 to actuate the step control cylinder 24 and lift carriage power unit 49, respectively. A solenoid actuated flow control valve 93 is provided to selectively actuate the riser safety guard cylinder 75. It is within the scope of the invention to alter the hydraulic control system as desired as long as the same overall operation of automatic lift assembly remains the same. The lift assembly can be powered by a separate 12-volt electric motor driven hydraulic pump and reservoir assembly (commonly called a "power pack") or can be tapped off from the supporting vehicle's power steering system.

Control of the lift function is by a four-way, three position hydraulic valve of conventional design. Positions of the valve are up—stop—down, with the valve spring loaded to the center "stop" position. Control of the step operation is also by a four-way, three position hydraulic valve of conventional design. Positions of the valve are in, stop, out, with the valve spring loaded to the center "stop" position. Cable control of the function valves are used rather than the more common electromagnetic solenoid valves with push-buttons because the push-buttons, electric cables, and electro-magnetic solenoid valves have a higher rate of failure than cable control. If a cable does fail, the operator can manually move the control valves to achieve the desired function. This is not possible with the electro-magnetic control valves in current use.

As stated previously, the lift assembly is raised and lowered by a power unit 49 commonly called a steering gear. Within the steering gear is a hydraulic cylinder in which the piston is hydraulically powered to either end of the cylinder. The piston's linear travel is transformed to rotary motion of the output shaft 50 by interference meshed teeth on the piston mating with teeth on the rotary output shaft. Maximum rotary motion of the output shaft 50 is generally 90 degrees.

As stated previously, the rotary output shaft 50 of the power unit 49 is securely engaged to the main pivot actuator shaft 51. The actuator shaft 51 is mounted to the step well and the pivot support arms 56 and 57 are fixedly secured thereto. Rotation of the shaft 51 moves the pivot support arms 56 and 57 up or down which act through connecting links 60 so as to correspondingly move the lift carriage 17. The power unit 49 includes a hydraulically operated piston. Power is supplied to the lift side of the piston only, the down function being a matter of releasing the trapped oil. Prior art devices have used linear actuators (hydraulic cylinders) to move arms in the manner described above which at some point leaves the piston rod exposed to the elements. Since the piston rod is the seal surface required to prevent the hydraulic fluid from leaking from the actuator cylinder, if the rod becomes pitted or nicked, it spoils the seal and the unit is disabled. The use of a power unit (steering gear) as described above has many advantages. One, it is sealed to survive in the hostile elements found underneath a vehicle. Two, it has no exposed piston rod. Three, it is a highly reliable product, manufactured in large quantities, and service parts readily available if needed. Four, it has a mechanical rotary input that, when turned manually, axially displaces the hydraulic piston, turning the rotary output shaft and thus manually moving the lift up or down as desired.

Movement of the steps is accomplished by using a double acting hydraulic cylinder of conventionally designed pushing or pulling linkage to extend or retract the folding step, and is controlled by a single valve as described above. There is no interconnection with the step and lift hydraulics, except that they share a common hydraulic power source and reservoir.

Movement of the riser 22 to the raised safety guard stop position is through a single acting hydraulic cylinder pushing linkage to displace the riser to approximately 35degrees above the horizontal plane of the lift platform. The hydraulic fluid power is directed to this cylinder whenever there is pressure on the "lift" or "up" side of the power unit piston, and is therefore controlled by the lift function control valve. A spring 80 retracts the power cylinder and attendant linkage when it can overcome the hydraulic pressure.

Placed within the hydraulic circuit between the "lift" or "up" side of the power unit piston and the ramp control cylinder is an electromagnetic solenoid control valve that is described as a three-way, two position normally closed valve of conventional design. Properly controlled, its function is to prevent hydraulic pressure from reaching the ramp control cylinder when the steps and riser are stowed, and/or to release the hydraulic pressure already applied to the ramp/riser cylinder to expedite movement of persons or equipment over the lowered ramp/riser.

A schematic diagram of the electrical control circuit is shown in FIG. 14. A standard 12-volt battery 94 is utilized to power the circuit. A pump motor 95 is controlled by a pump motor control solenoid 96. A lift stop solenoid 97 and a riser safety solenoid 98 are provided to actuate the lift stop actuating assembly and the riser safety assembly, respectively.

A step control valve switch 99, a lift carriage control valve switch 100, a riser over-ride switch 101, a riser control switch 102 and a push-button lift carriage safety stop solenoid switch 103 are provided to perform their respective functions as discussed herein. In addition, a master power on-off switch 104 and a door interlock control switch 105 are incorporated into the circuitry. The door interlock control switch 105 prevents operation of the lift carriage when the vehicle doors are closed. As shown in FIG. 15, a control panel 106 is provided near the vehicle operator's station so as to permit operation of the automatic lift assembly by the driver of the vehicle.

One embodiment of the vertical track body guides 19 is shown in FIG. 17. As stated previously, the vertical body guides 19 are mounted vertically along each side of the door opening. The vertical body guide 19 consists of a channel member which has side walls 107 which are slanted inwardly so as to retentively engage the grooved portion of each of the rollers 18. The rollers 18 are mounted in spaced-apart vertically aligned positions within vertically oriented channels 108 provided on each side wall of the lift carriage 17. As shown in FIG. 17, the lift carriage mounted channels 18 are in parallel spaced-apart alignment with the vertical body guides 19 so that the rollers 18 extend into operative engagement with the ends of the sidewalls 107 of the vertical body guides 19. Thus positioned, the rollers 18 are in slidable engagement with the vertical guides 19. The rollers 18 selectively move up and down within the body guides 19 as the lift carriage 17 is selectively moved from its intermediate normal step position downwardly to its lowered ground level position and/or upwardly to its raised interior floor level position. The unique slidable retentive engagement of the rollers 18 within the vertical guides 19 provides for greater stability in the vertical movement of the lift carriage 17 within the door opening.

It is thus seen that an automatic lift device for use in doorway openings of buildings or of vehicles is provided which is versatile and safe in operation and which is not complicated in design. The relative simplicity of the structure results in ease of manufacture, installation and maintenance with resultant savings in costs. The versatility of the instant automatic lift device permits selective manual operation of the unit in the event of failure of the hydraulic and/or electrical systems associated therewith. This feature is of great importance in that the automatic lift device is used by handicapped persons who could not cope physically or emotionally with such failures.

From this presentation of an operative embodiment of my invention, improvements, modifications and substitutions will become apparent to those skilled in the art. Such improvements, modifications and substitutions are intended to be included within the spirit of the invention limited only by the scope of the hereinafter appended claims.

I claim:

1. In an automatic lift assembly for use in vehicle or building doorways comprising:

a lift carriage movably positioned within a doorway opening, said lift carriage having a substantially U-shaped configuration wherein the base of the lift carriage is adapted to form a lower step portion;

a movable upper step pivotally positioned within said lift carriage in a normally retracted stowed step use position above and to the rear of said lower step portion, said upper step selectively extendable forwardly and downwardly so as to form a co-planar platform extension of said lower step portion;

a movable riser provided in pivotal engagement with said upper step so as to selectively extend downwardly to said lower step portion when said upper step is in its retracted stowed step use position within the lift carriage, said riser selectively extendable upwardly and outwardly to form a ramp extension from said extended upper step;

upper step and riser actuating means to selectively extend said upper step forwardly and downwardly so as to form a co-planar platform extension of said lower step portion and to selectively pivotally extend said riser upwardly and outwardly to form a ramp extension from said extended upper step; and lift carriage actuating means to selectively lower said lift carriage to a lowered ground level position and to selectively raise said lift carriage to a raised interior floor level position.

2. In the automatic lift assembly of claim 1 wherein said lift carriage actuating means include a main pivot actuator shaft positioned behind said lift carriage, said pivot actuator shaft having a pair of fixed spaced-apart pivot support arms which bracket and are in pivotal link engagement with said lift carriage, said actuator shaft selectively rotatable so as to selectively raise and lower said lift carriage.

3. In the automatic lift assembly of claim 2 wherein said main pivot actuator shaft is selectively rotated by a hydraulically operated steering gear power unit, said steering gear power unit is adapted to translate the linear motion of a piston provided therein to rotary motion to drive said main pivot actuator shaft.

4. In the automatic lift assembly of claim 3 wherein safety stop assembly means are provided in the doorway opening in selective engagement with said pivot support arms so as to support said lift carriage in its intermediate normal use position, said safety stop assembly means selectively retractable out of engagement with said pivot support arms so as to permit selective raising and lowering of said lift carriage.

5. In the automatic lift assembly of claim 4 wherein riser safety guard actuating means are provided in association with said movable upper step and said pivotally movable riser, said riser safety guard actuating means adapted to selectively pivot said riser to an upwardly inclined safety guard position when said upper step is in its extended platform extension position.

6. In the automatic lift assembly of claim 5 wherein a spring biased safety shield panel slidably mounted in engagement with said lift carriage, said safety shield panel adapted to move downwardly with said lift carriage to the lowered ground level position.

7. In the automatic lift assembly of claim 6 wherein control panel means are provided to selectively control said lift carriage actuating means, said movable upper step and said riser in association therewith, said safety stop assembly means and said riser safety guard actuating means.

8. In the automatic lift assembly of claim 1 wherein said lift carriage actuating means are adapted to be selectively manually operable in the event of power failure.

9. In the automatic lift assembly of claim 1 wherein vertical track guides having inwardly sloped sidewalls are mounted along each side of the doorway opening, said inwardly sloped sidewalls adapted to retentatively engage vertically aligned spaced-apart grooved rollers provided on said lift carriage, said rollers vertically movable along said vertical track guides in response to corresponding vertical movement of said lift carriage.

* * * * *